(12) United States Patent
Stedman et al.

(10) Patent No.: US 9,148,406 B2
(45) Date of Patent: Sep. 29, 2015

(54) PROTECTED MEDIA STREAM SOURCE

(75) Inventors: Roy Stedman, Austin, TX (US); Glen B. Robson, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 681 days.

(21) Appl. No.: 13/457,132

(22) Filed: Apr. 26, 2012

(65) Prior Publication Data

US 2013/0286224 A1   Oct. 31, 2013

(51) Int. Cl.
*H04L 29/06* (2006.01)

(52) U.S. Cl.
CPC ............. *H04L 63/0281* (2013.01); *H04L 63/04* (2013.01)

(58) Field of Classification Search
CPC ......... H04N 5/232; H04N 5/225; H04N 5/76; H04N 9/04; H04N 7/18; G06K 9/36; G06K 9/20; G06K 9/40
USPC ........... 348/211.99, 211.3, 207.1, 231.9, 143, 348/159; 382/276, 282–283, 260; 725/45, 725/46
See application file for complete search history.

(56) References Cited

U.S. PATENT DOCUMENTS

| | | | |
|---|---|---|---|
| 2003/0041326 A1* | 2/2003 | Novak et al. | 725/25 |
| 2004/0105006 A1* | 6/2004 | Lazo et al. | 348/169 |
| 2012/0140083 A1* | 6/2012 | Schultz et al. | 348/207.1 |

* cited by examiner

*Primary Examiner* — Mekonnen Dagnew
(74) *Attorney, Agent, or Firm* — Terrile, Cannatti, Chambers & Holland, LLP; Stephen A. Terrile

(57) ABSTRACT

A media stream source protection system in which a media stream is passed through a gatekeeper before being used by any other software or hardware within the information handling system. In certain embodiments, the video camera encrypts and the gatekeeper decrypts content received from the video camera before the content is provided to the gatekeeper. In certain embodiments, the encryption is performed on the camera device as part of the video encode incorporated the video camera thus providing a bandwidth-saving measure.

15 Claims, 3 Drawing Sheets

PROTECTED MEDIA STREAM SOURCE

BACKGROUND OF THE INVENTION

1. Field of the Invention

The present invention relates to information handling systems and more particularly to protecting a media stream source used with information handling system video cameras.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with an integrated video camera (e.g., a webcam). For example, all in one type information handling systems or portable type information handling systems may include the video camera within the housing of the system while stand alone type information handling systems may include the video camera which is associated with the display device of the information handling system. In certain systems the video camera may be integrated with the display device. In other systems, the video camera may be coupled to the information handling system and then located in proximity with the display device.

An issue has presented itself as video cameras have become more ubiquitous. This issue relates to user privacy concerns. It has been determined that users are becoming increasingly concerned about privacy issues as well as the difficulty in detecting when a video camera is enabled. This issue has become more pressing in a number of instances such as unauthorized users or applications enabling the video camera, malware that unobtrusively turns on the video camera, institutions such as school districts spying on users when they are remote from the school as well as concerns about any background information that is detectable via the video camera and general privacy issues.

To address this privacy issue it is known to provide a video camera with a physical shutter mechanism. When the shutter is open there is no blocking of the image, but when the shutter is physically closed the image is blocked. This issue has also been addressed by placing an opaque material such as tape over the video camera. Additionally, some video cameras have an indicia such as a light to indicate when the video camera is active. One issue with the indicia is there have been certain types of malware application which disable the indicia even when the video camera is active. Additionally, to address this issue certain parental controls have been introduced which disable or limit access to the video camera.

What is needed is an intuitive method to protect media streams generated by cameras.

SUMMARY OF THE INVENTION

In accordance with the present invention, a media stream source protection system is set forth. More specifically, with the media stream source protection system, a media stream is passed through a gatekeeper before being used by any other software or hardware within the information handling system. In certain embodiments, the video camera encrypts and the gatekeeper decrypts content received from the video camera before the content is provided to the gatekeeper. In certain embodiments, the encryption is performed on the camera device as part of the video encode incorporated the video camera thus providing a bandwidth-saving measure. In this embodiment, the encryption corresponds to known data encryption techniques; alternately, the encryption is specific to the video encode operation of the camera device. In other embodiments, the gatekeeper verifies that the gatekeeper is the first driver or filter graph member to receive the content from the video camera. The filter graph is the set of software and middleware components used for multimedia processing. In this embodiment, if the stream is intercepted prior to receipt by the gatekeeper component, the stream is not usable and is not forwarded beyond the gatekeeper.

Additionally, in certain embodiments, the gatekeeper component is included in a driver chain or filter graph. In these embodiments, the gatekeeper includes a watchdog thread that monitors the relative position of the gatekeeper in the chain. The watchdog thread either moves the gatekeeper to the beginning of the chain or generates a warning that the media stream is potentially at-risk due to the position of the gatekeeper behind other components of the driver chain or filter graph. In this embodiment, an encryption function is not necessary, but adding encryption components provides an additional level of safety of the gatekeeper such as in cases where legitimate software accidentally intercepts the stream before the gatekeeper.

Additionally, in certain embodiments, the gatekeeper component includes a permissions model where the gatekeeper component monitors content sinks (i.e., the consumer of the media content such as a playback application that displays the media content to a user via a media device) and verifies that the content sinks have been approved by a user, either on a per-component or application basis (e.g., by querying a user for permission to permanently allow an application to have access to the content) or on a per-instance basis (e.g., by querying a user for permission every time an application desires access to the content). If a sink is not approved by the user, the gatekeeper can source alternative content such as a locked media signal or can block the connection with the video camera entirely. In various embodiments, the media stream includes a video stream and an audio stream and the locked media signal includes either or both a locked video stream and a locked audio stream.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
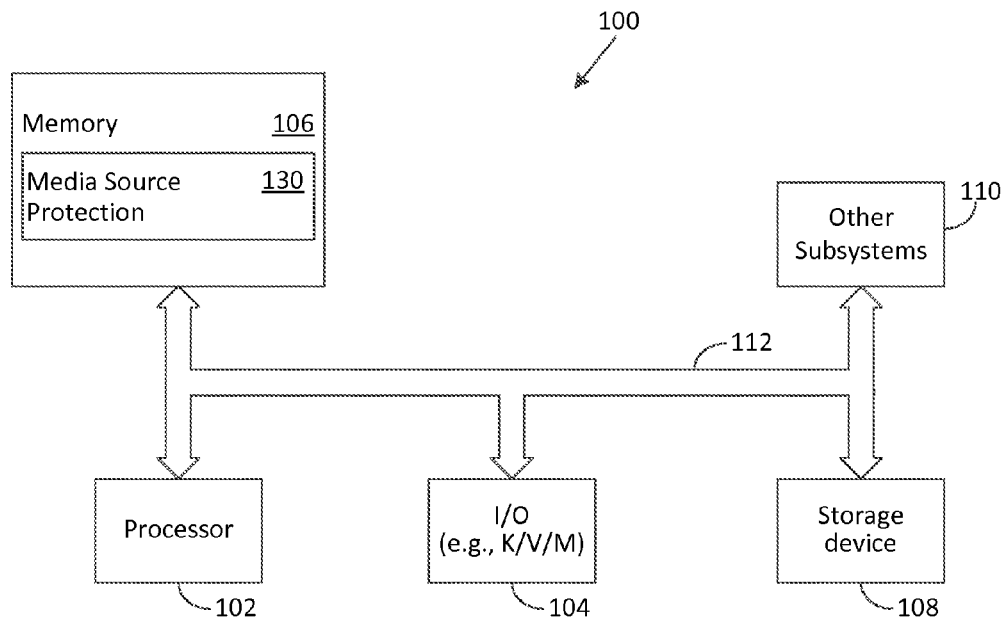
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, a video camera and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The memory 106 also stores a media stream source protection module 130.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
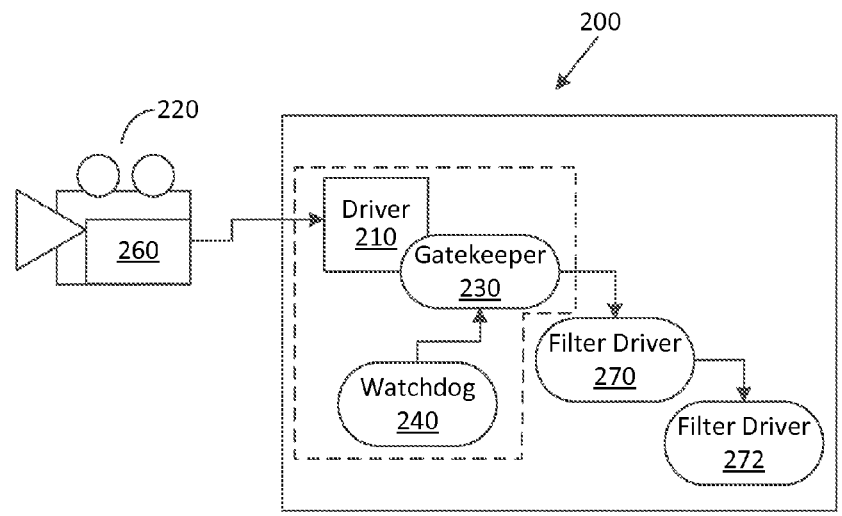
FIG. 2 shows a block diagram of a media stream source protection system.

Referring to FIG. 2, a block diagram of a media stream source protection system 200 is shown. More specifically, the media stream source protection system 200 includes a driver 210 that interacts with and controls a video camera 220. The driver 210 includes a gatekeeper component 230 as well as a watchdog component 240. The camera 220 includes a media signal processing module 260. The driver 210 installs and maintains a first position in a filter graph of the information handling system 100.

In operation, a media stream generated by the video camera 220 is processed by the media signal processing module 260 and then provided to the driver 210. The media stream is then passed through the gatekeeper component 230 before being used by any other software or hardware within the information handling system (e.g., filter drivers 270, 272). The media signal processing component 260 encrypts content received from the video camera before the content is provided to the gatekeeper. In certain embodiments, the encryption is performed by the video camera 220 as part of the video encode incorporated the video camera thus providing a bandwidth-saving measure. In this embodiment, the encryption corresponds to known data encryption techniques; alternately, the encryption is specific to the video encode operation of the camera device. In other embodiments, the gatekeeper component 230 verifies that the gatekeeper component 230 is the first driver or filter graph member to receive the content from the video camera 220. The filter graph is the set of software and middleware components used for multimedia processing. In this embodiment, if the stream is intercepted prior to receipt by the gatekeeper component 230, the stream is not usable and is not forwarded beyond the gatekeeper component 230.

Additionally, in certain embodiments, the gatekeeper component 230 is included in either within the driver 210 or within the filter graph. In these embodiments, the gatekeeper component 230 includes the watchdog thread 240 that monitors the relative position of the gatekeeper within the chain of the filter graph. The watchdog component 240 either moves the gatekeeper to the beginning of the filter chain or generates a warning that the media stream is potentially at-risk due to the position of the gatekeeper behind other components of the driver chain or filter graph. In this embodiment, an encryption function (such as that provided by media signal processing module 260) is not necessary, but adding encryption components provides an additional level of safety of the gatekeeper such as in cases where legitimate software accidentally intercepts the stream before the gatekeeper.

Additionally, in certain embodiments, the gatekeeper component 230 includes a permissions model where the gatekeeper component 230 monitors content sinks and verifies that the content sinks have been approved by a user, either on a per-component or application basis (e.g., by querying a user for permission to permanently allow an application to have access to the content) or on a per-instance basis (e.g., by querying a user for permission every time an application desires access to the content). If a sink is not approved by the user, the gatekeeper component 230 can source alternative content such as a locked media signal or can block the connection with the video camera entirely. In various embodiments, the media stream includes a video stream and an audio stream and the locked media signal includes either or both a locked video stream and a locked audio stream.

Figure 3:
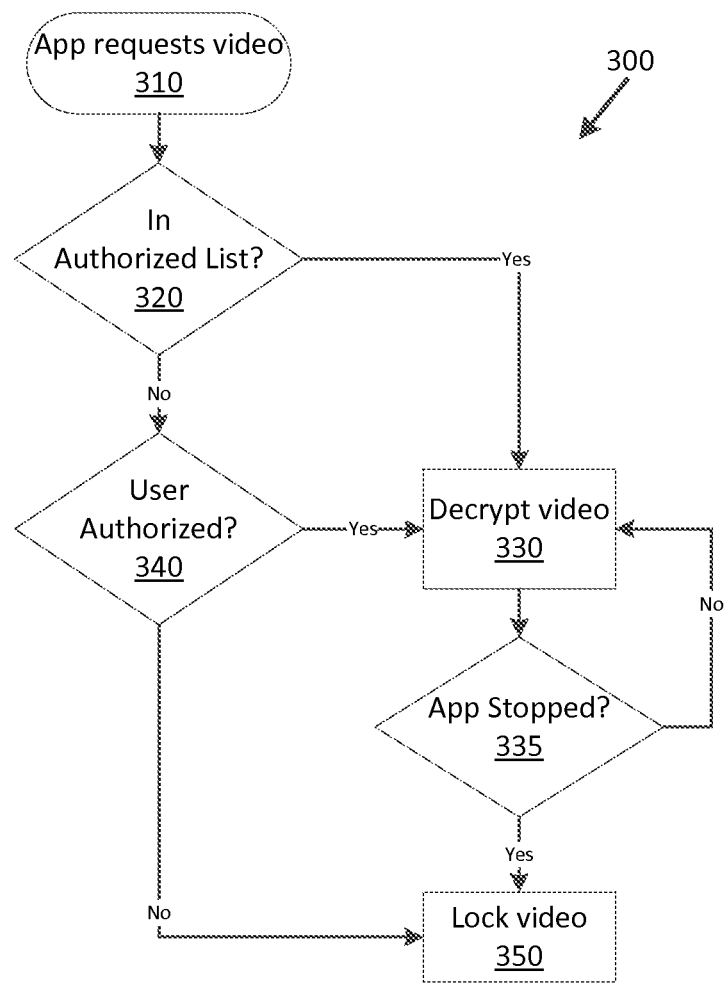
FIG. 3 shows a flow chart of the operation of a media stream source protection system.

FIG. 3 shows a flow chart of the operation of a media stream source protection system. More specifically, in operation, the media stream source protection system 200 is started when an application requests a media signal from the camera 220 at step 310. Next, the media stream source protection system 200 determines whether the application is on an authorized list of applications at step 320. If the application is on an authorized list, then the media stream source protection system 200 proceeds with decoding the media signal provided by the video camera at step 330. The media stream source protection system 200 then determines whether the application operation is complete at step 335. If the application operation is not complete, then the media stream source protection system 200 continues decoding the media signal at step 330.

If the application is not on the authorized list, then the media stream source protection system 200 determines whether the request by the application is authorized by a user at step 340 (e.g., by querying the user regarding whether the application request is authorized). If the application access authorized by the user, then the media stream source protection system 200 proceeds with decoding the media signal provided by the video camera at step 330. If the application access is not authorized by the user, then the media stream source protection system 200 locks the media stream and provides a locked media stream at step 350. The locked media stream may be a blank screen, a text message, an icon, a static image (such as an avatar, a photograph, etc., pixilated video, or some other predetermined output.

Figure 4:
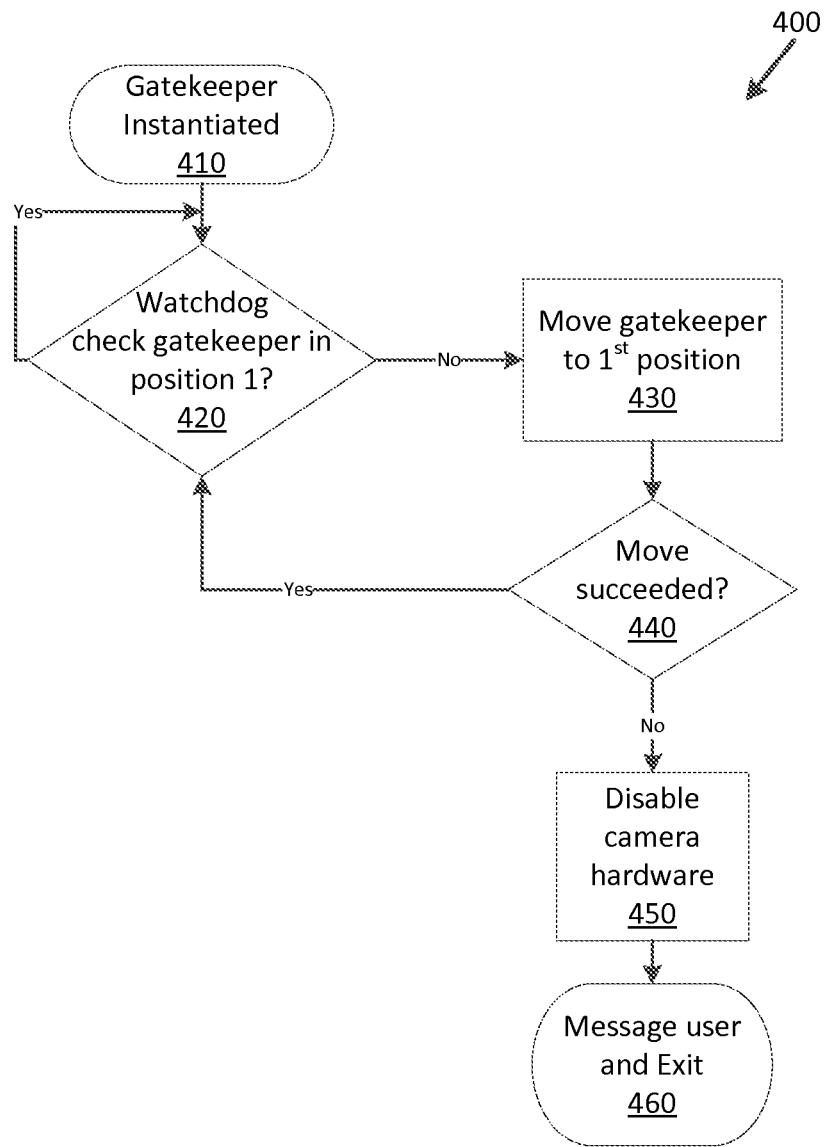
FIG. 4 shows another flow chart of the operation of a media stream source protection system.

FIG. 4 shows another flow chart of the operation of a media stream source protection system. More specifically, when a media stream is generated by the camera 220 and provided to the information handling system 100, a gatekeeper is instantiated at step 410. Next, at step 420, the watchdog component 240 confirms that the gatekeeper is located at the first position within the filter graph. If the gatekeeper component is located at the first position within the filter graph, then the operation continuously monitors the media stream to assure that the gatekeeper component maintains the first position within the filter graph.

If the gatekeeper component 230 is not in the first position within the filter graph, then the media stream source protection system moves the gatekeeper component to the first position within the filter graph at step 430. Next, at step 440, the watchdog component 240 determines whether the move was successful. If the move was successful, then the operation returns to step 420 to confirm that the gatekeeper is located at the first position within the filter graph. If the move was not successful, then the media stream source protection system disables the camera hardware at step 450 and generates a message to inform users that there is a potential security issue with the camera at step 460.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, in certain embodiments, the media stream source protection system 200 may interact with malware protection software such as virus or spyware prevention software to determine whether certain events for locking or unlocking the video camera are allowable. This interaction may function similarly to that of a firewall software where certain input, such as certain recognized faces or badges, automatically unlock the video camera.

Also for example, in certain embodiments, the media stream source protection system 200 may be configured to allow an administrator such as an information technologies (IT) administrator to control decoding, locking and/or unlocking of the media signal based on user policies, time of day or other conditions.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for providing media stream source protection to an information handling system comprising:
   executing a driver to control the camera;
   coupling a gatekeeper component with the driver, the gatekeeper component providing media stream source protection function to the driver;
   maintaining the gatekeeper component in a first position within a filter graph; and,
   confirming the gatekeeper component is located in the first position within the filter graph; and wherein
   if the media stream is intercepted prior to receipt by the gatekeeper component, the stream is not usable and is not forwarded beyond the gatekeeper component.

2. The method of claim 1 further comprising:
   encoding the media stream via the camera.

3. The method of claim 2 further comprising:
   decoding the media stream via the gatekeeper component.

4. The method of claim 1 wherein:
   the gatekeeper includes a watchdog, the watchdog thread monitoring a relative position of the gatekeeper component within the filter graph.

5. The method of claim 4 further comprising:
   generating a warning that the media stream is potentially at-risk due to the relative position of the gatekeeper component behind other components of the filter graph.

6. The method of claim 5 further comprising:
   encrypting the media stream between the camera and the gatekeeper component so as to provide an additional level of safety for the media stream.

7. Information handling system comprising:
   a processor;
   a gatekeeper component coupled to a driver, the gatekeeper component providing media stream source protection function to the driver;
   memory coupled to the processor, the memory storing a camera lock system for performing a camera lock operation, the camera lock system comprising instructions executable by the processor for:
   executing the driver to control the camera;
   maintaining the gatekeeper component in a first position within a filter graph; and,
   confirming the gatekeeper component is located in the first position within the filter graph; and wherein
   if the media stream is intercepted prior to receipt by the gatekeeper component, the stream is not usable and is not forwarded beyond the gatekeeper component.

8. The information handling system of claim 7 wherein the camera lock system further comprises instructions for:
   encoding the media stream via the camera.

9. The information handling system of claim 8 wherein the camera lock system further comprises instructions for:
   decoding the media stream via the gatekeeper component.

10. The information handling system of claim 7 wherein:
the gatekeeper includes a watchdog, the watchdog thread monitoring a relative position of the gatekeeper component within the filter graph.

11. The information handling system of claim 10 wherein the camera lock system further comprises instructions for:
encrypting the media stream between the camera and the gatekeeper component so as to provide an additional level of safety for the media stream.

12. A non-transitory computer readable media, the computer readable media storing instructions executable by the processor for:
executing a driver to control the camera;
coupling a gatekeeper component with the driver, the gatekeeper component providing media stream source protection function to the driver;
maintaining the gatekeeper component in a first position within a filter graph; and,
confirming the gatekeeper component is located in the first position within the filter graph; and wherein
if the media stream is intercepted prior to receipt by the gatekeeper component, the stream is not usable and is not forwarded beyond the gatekeeper component.

13. The non-transitory computer readable media of claim 12 further comprising instructions for:
encoding the media stream via the camera.

14. The non-transitory computer readable media of claim 13 further comprising instructions for:
decoding the media stream via the gatekeeper component.

15. The non-transitory computer readable media of claim 12 wherein:
the gatekeeper includes a watchdog, the watchdog thread monitoring a relative position of the gatekeeper component within the filter graph.

\* \* \* \* \*